United States Patent
Liu et al.

(10) Patent No.: US 11,321,611 B2
(45) Date of Patent: May 3, 2022

(54) DEPLOYMENT VERIFICATION OF AUTHENTICITY OF MACHINE LEARNING RESULTS

(71) Applicant: INTERNATIONAL BUSINESS MACHINES CORPORATION, Armonk, NY (US)

(72) Inventors: Frank Liu, Austin, TX (US); Bishop Brock, Coupland, TX (US); Thomas S. Hubregtsen, Munich (DE)

(73) Assignee: International Business Machines Corporation, Armonk, NY (US)

(*) Notice: Subject to any disclaimer, the term of this patent is extended or adjusted under 35 U.S.C. 154(b) by 883 days.

(21) Appl. No.: 16/150,427

(22) Filed: Oct. 3, 2018

(65) Prior Publication Data

US 2020/0110993 A1  Apr. 9, 2020

(51) Int. Cl.
   *G06N 3/08* (2006.01)
   *G06N 5/04* (2006.01)

(52) U.S. Cl.
   CPC ............. *G06N 3/08* (2013.01); *G06N 5/04* (2013.01)

(58) Field of Classification Search
   CPC .................................. G06N 3/08; G06N 5/04
   See application file for complete search history.

(56) References Cited

U.S. PATENT DOCUMENTS

| | | | |
|---|---|---|---|
| 9,553,725 B2 | 1/2017 | Bennett et al. | |
| 2015/0227741 A1 | 8/2015 | Permeh et al. | |
| 2016/0034809 A1* | 2/2016 | Trenholm | G06K 9/00536 706/20 |
| 2018/0158552 A1* | 6/2018 | Liu | G06N 3/0454 |
| 2019/0122104 A1* | 4/2019 | Zhang | G06N 3/0454 |

FOREIGN PATENT DOCUMENTS

CN   106886820 A   6/2017

OTHER PUBLICATIONS

Watanabe, S., Hori, T., Le Roux, J., & Hershey, J. R. (Mar. 2017). Student-teacher network learning with enhanced features. In 2017 IEEE International Conference on Acoustics, Speech and Signal Processing (ICASSP) (pp. 5275-5279). IEEE. (Year: 2017).*

Luong, M. T., Pham, H., & Manning, C. D. (2015). Effective approaches to attention-based neural machine translation. arXiv preprint arXiv: 1508.04025. (Year: 2015).*

(Continued)

*Primary Examiner* — Kamran Afshar
*Assistant Examiner* — Henry Trong Nguyen
(74) *Attorney, Agent, or Firm* — Christopher M. Pignato; Nicholas L. Cadmus

(57) ABSTRACT

Authenticity of Artificial Intelligence (AI) results may be verified by creating, for an AI system, from a plurality of original inputs to form a plurality of original inference results, a plurality of original signatures of representative elements of an internal state of the AI system constructed from each individual original inference result of the plurality of original inference results. During deployment of the AI system, a matching of a plurality of deployment time inference results with a plurality of deployment time signatures, to the plurality of original signatures and the plurality of original inference results, may be verified.

17 Claims, 7 Drawing Sheets

(56) References Cited

OTHER PUBLICATIONS

Leroux, S., Bohez, S., De Coninck, E., Verbelen, T., Vankeirsbilck, B., Simoens, P., & Dhoedt, B. (2017). The cascading neural network: building the internet of smart things. Knowledge and Information Systems, 52(3), 791-814. (Year: 2017).*
Krogh, A., & Hertz, J. A. (1992). Generalization in a linear perceptron in the presence of noise. Journal of Physics A: Mathematical and General, 25(5), 1135. (Year: 1992).*
Cao, J., Cui, H., Shi, H., & Jiao, L. (2016). Big data: A parallel particle swarm optimization-back-propagation neural network algorithm based on MapReduce. PloS one, 11(6), e0157551. (Year: 2016).*
Hidasi, B., Quadrana, M., Karatzoglou, A., & Tikk, D. (Sep. 2016). Parallel recurrent neural network architectures for feature-rich session-based recommendations. In Proceedings of the 10th ACM conference on recommender systems (pp. 241-248). (Year: 2016).*
Allen, Greg et al.: :Artificial Intelligence and National Security Harvard Kennedy School, Belfer Center for Science and International Affairs; Issued Jul. 2017.
Anonymous, "A new approximate inference method for the spike and slab model: expectation propagation with a replication trick An IP.com Prior Art Database", IPCOM000227621D, May 9, 2013, 13 pages.
Anonymous, "Methods for Deep Learning Network Compression for Resourceconstrained Devices", IPCOM000246620D, Jun. 21, 2016, 5 pages.
IBM et al., "Using quantized probabilities to overcome the requirement of fully observed data in generic Bayesian networks structure learning algorithms", IPCOM000183826D, Jun. 2, 2009, 4 pages.

* cited by examiner

DEPLOYMENT VERIFICATION OF AUTHENTICITY OF MACHINE LEARNING RESULTS

BACKGROUND

Machine learning is widely used for training systems to perform various tasks (e.g., recognizing objects, recognizing speech, language translation), and may be used in Artificial Intelligence (AI) systems. In many computing environments, users may need to verify that a trained AI system has not been corrupted, such that current output results are not the results that are expected from the originally trained AI system.

SUMMARY

According to one aspect, authenticity of Artificial Intelligence (AI) results may be verified by creating, for an AI system, from a plurality of original inputs to form a plurality of original inference results, a plurality of original signatures of representative elements of an internal state of the AI system constructed from each individual original inference result of the plurality of original inference results. During deployment of the AI system, a matching of a plurality of deployment time inference results with a plurality of deployment time signatures, to the plurality of original signatures and the plurality of original inference results, may be verified.

A method, system, and computer program product are provided for verifying the authenticity of AI results.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1A:
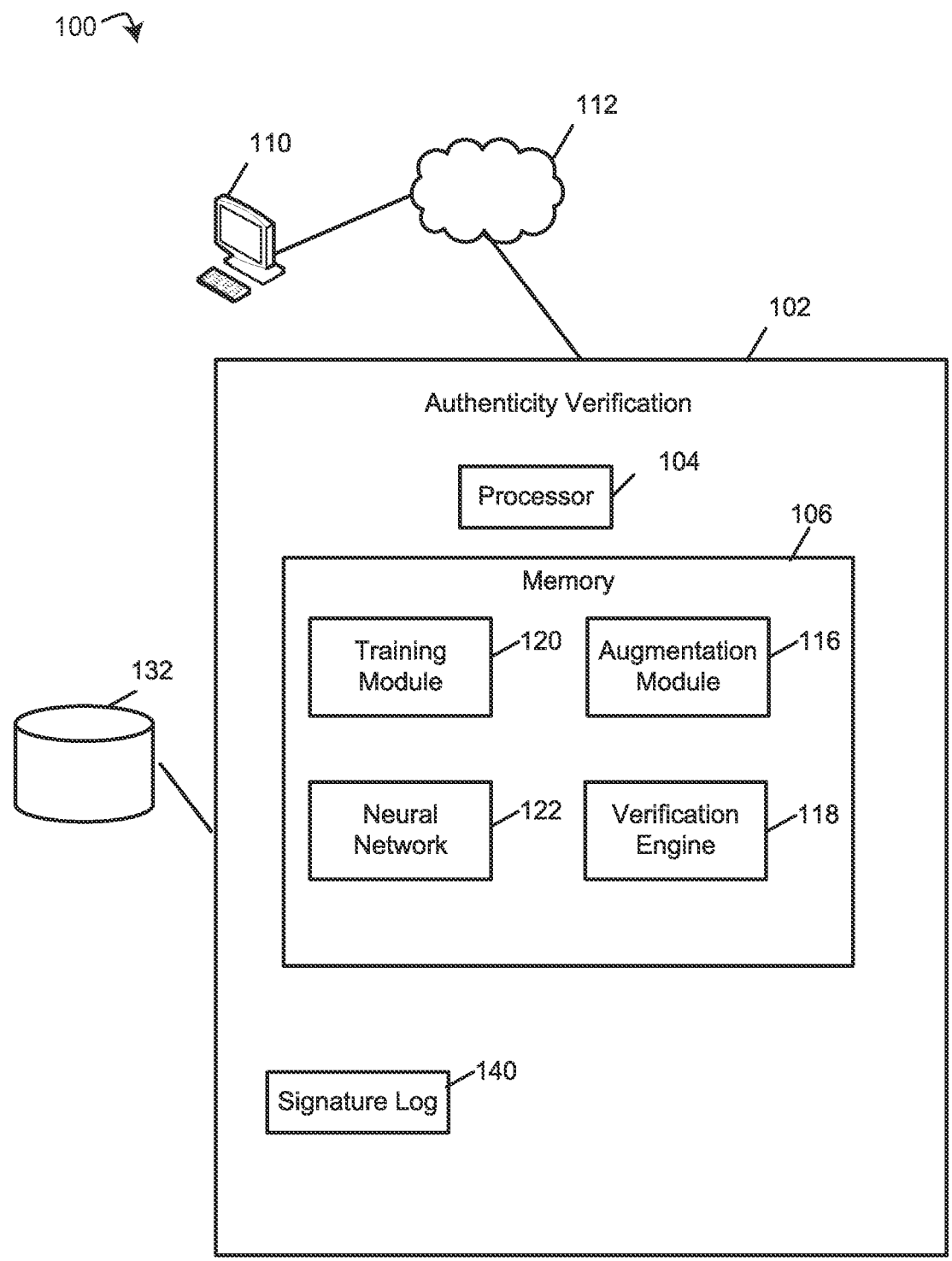
FIG. 1A is a schematic diagram of an embodiment of a system for verifying the authenticity of Artificial Intelligence (AI) results.

The present disclosure relates to verifying the authenticity of machine learning results. More specifically, the present disclosure relates to deployment verification of the authenticity of Artificial Intelligence (AI) results.

As an example, neural networks (e.g., Deep Neural Networks (DNNs)) are widely used in machine learning applications. However, developing a neural network (including both the topology and parameters) is not trivial and may involve substantial expertise and domain knowledge. For example, the "supplier" and the "consumer" of a DNN may not be the same entity. Hence they may be developed by a special group of experts, although they may be used by many users. Tampering may thus occur due to the separation of model development and model usage.

Thus, questions may arise regarding whether the correct DNN model is used in a deployment (e.g., in an Internet of Things (IoT) edge device). For example, a DNN-enabled camera is supposed to detect a suspect, but the user may need to ensure that the correct version of the trained model has been uploaded, and that there has been no malicious attempt to tamper with the DNN model.

As used herein, the "internet of things," or IoT, refers to a system of interrelated computing devices, mechanical and digital machines, objects, animals or people that are provided with unique identifiers (UIDs) and the ability to transfer data over a network without requiring human-to-human or human-to-computer interaction.

In some embodiments discussed herein, a neural network may advantageously be augmented with a parallel network, which is capable of generating a unique signature for each inference.

Example techniques discussed herein may advantageously provide a mechanism for verifying the authenticity of machine learning results (e.g., inferences), automatically, thus verifying the authenticity of the neural network.

In some embodiments, the mechanism may be used to track a particular action (e.g., a particular model was applied to a particular image, with logging of actions and timestamps). For example, such tracking may be used to determine usage of a model and/or an image (or other input).

As discussed in more detail below, a system and method can be used for any type of device or application. In some embodiments, the system and method may automatically obtain a signature representing a particular input coupled with a particular trained neural network, by inputting the input to an augmented version of the neural network (augmented with a signature network). The signature is deterministic, and thus, the same signature (or substantially the same signature) is generated each time the same input is provided as input to the same augmented neural network. Thus, if a copy of a trained augmented neural network is deployed, then the deployed version may be tested by providing the same input to the deployed version (the copy) as is provided to the original version, to generate the signature that is output from the augmented part of the neural network (i.e., the signature network). The two signatures may then be matched. A match result may serve to authenticate the results of the system, while signatures not matching may indicate one or more issues with the integrity of the neural network (i.e., the "copy" is no longer a true "copy").

For example, FIG. 1A shows an example embodiment of a system 100 for verifying the authenticity of Artificial Intelligence (AI) results. As shown in the embodiment of FIG. 1A, an authenticity verification system 102 includes a processor 104, a memory 106 storing components of authenticity verification system 102, and a signature log 140 that stores signatures generated by authenticity verification system 102. For example, memory 106 may include a computer readable storage medium, as discussed further below. For example, signature log 140 may store generated signatures and temporal indicators (e.g., timestamps), as well as other metadata related to the generated signatures (e.g., indicators identifying input data used to generate the signatures, version number of the generating system). System 102 may communicate with a device 110, for example, to send inputs for testing, as well as to communicate signatures for matching, and/or certification of authenticity as a result of the testing. For example, system 102 may communicate with device 110 via a network 112. In some embodiments, network 112 may be a wide area network ("WAN"), e.g., the Internet. In other embodiments, network 112 may be a local area network ("LAN"). For example, in a more remote location far from a metropolitan area, the Internet may not be available. In yet other embodiments, network 112 may be a combination of a WAN and a LAN. For example, device 110 may provide automated cryptography validation.

As shown in FIG. 1A, system 102 may include a training module 120, a neural network 122, an augmentation module 116, and a verification engine 118. While these components are shown as boxes with a processor and a memory in FIG. 1A, one skilled in the art will understand that the functionality may be stored on a chip (e.g., a graphics processing unit (GPU)), for fast, powerful processing. For example, verification engine 118 may communicate with device 110, to obtain a result of testing of a deployed version of neural network 122 on device 110, with certain input, to verify the authenticity of AI results generated using the input, by matching signatures, as discussed further herein. For example, the testing may be offered as a cloud service, for users of deployed copies of neural network 122.

Training module 120 may train neural network 122. For example, neural network 122 may be trained (using training data) to recognize various objects in an image. As an example, in a medical scenario, neural network 122 may be trained to recognize images of various types of tumors, based on very large training sets, wherein such training may require several days of processing time. As other examples, network 122 may be trained to perform speech recognition, or to perform language translations. One skilled in the art of computing will understand that neural networks, trained by machine learning, may be used in many different scenarios.

Augmentation module 116 may generate an augmented network for neural network 122, for generating signatures as output, using the inputs of neural network 122. For example, augmentation module 116 may generate a signature network that runs in parallel with neural network, as discussed further below. In some embodiments, the signature network may be generated as neural network 122 is being trained, or it may be generated after training of neural network 122 is complete. As discussed further below, augmentation module 116 may randomly select a subset (i.e., a portion) of the nodes of the hidden layer (inner layer) of neural network 122, and connect each selected node of the neural network to a corresponding node of the signature network, via an edge. The selected nodes may be selected to have a wide spread over neural network 122, to provide information from various areas of neural network 122, without selecting large numbers of nodes in clusters, which may affect entropy.

Weights may be assigned to the edges connected the selected nodes to their corresponding signature network nodes, with higher valued weights assigned to edges for selected nodes trained earlier in training of neural network 122, and lower valued weights (in comparison to the higher valued weights) assigned to assigned to edges for selected nodes trained later in training of neural network 122.

A repository 132 may store data that may be processed by system 102.

Figure 1B:
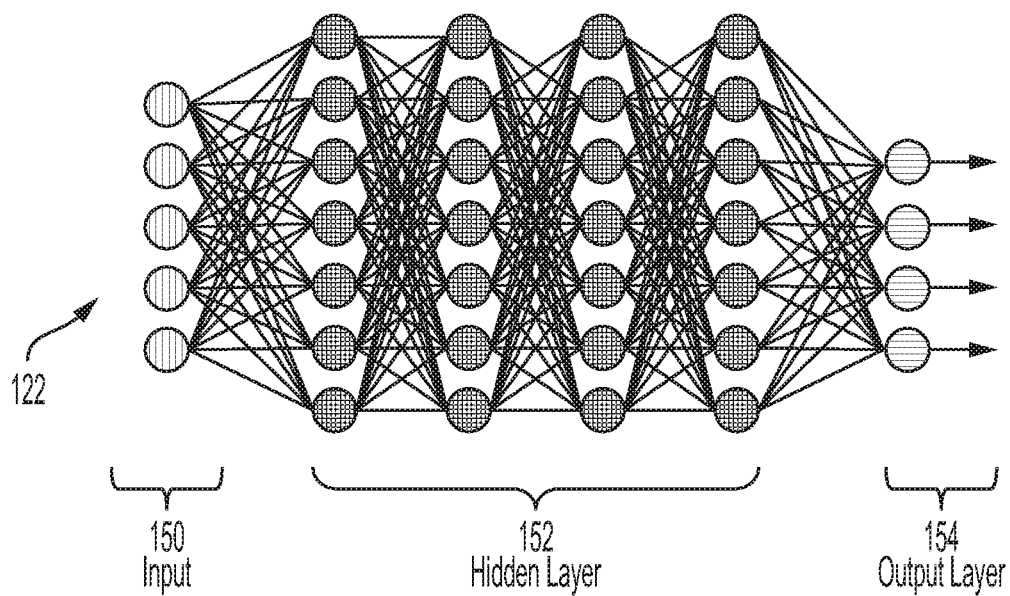
FIG. 1B is a schematic diagram of an embodiment of an AI system.

FIG. 1B is a schematic diagram of an embodiment of an AI system. As shown in FIG. 1B, a deep neural network (DNN) 122 includes an input layer 150, a hidden layer 152, and an output layer 154. As shown in FIG. 1B, the input layer includes a plurality of nodes for input. For example, a vector of input values may be input to input layer 150. As shown in FIG. 1B, hidden layer 152 (or inner layer) includes nodes multiple levels, with nodes in each level connected via edges to all nodes in the next level, from input node to output nodes in output layer 154. For example, as each node processes its inputs, the inputs are multiplied by weights on incoming edges, those results are aggregated together, to generate a node output that is propagated to the next layer of node (e.g., left to right processing in FIG. 1B.). For example, an activation energy of each node is a unique function of input to the node and weights. For example, the output of output layer 154 may include an inference resulting from processing of the input by neural network 122. For example, an input of image data to input layer 150 may result in an output of an inference of a "cat" in the input image (i.e., a classification result).

For example, each node in hidden layer 152 may include processing functionality for the input to that node (e.g., functions, weights to be applied). Further, each edge connecting the nodes may be weighted, for processing inputs, as a result of the training of neural network 122.

Figure 1C:
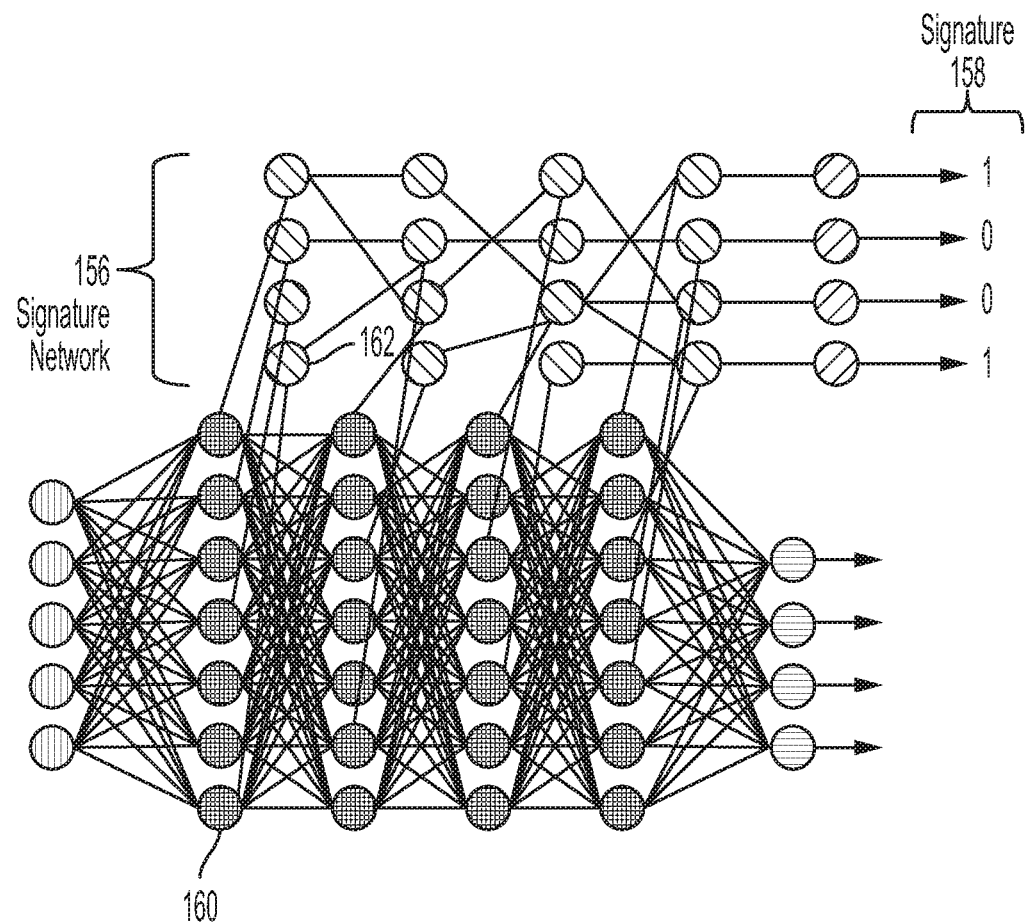
FIG. 1C is a schematic diagram of an embodiment of an AI system augmented with a signature system.

FIG. 1C is a schematic diagram of an embodiment of an AI system augmented with a signature network 156. For example, augmentation module 116 may randomly select a subset of nodes of neural network 122, and connect each selected node with a corresponding node in signature network 156. For example, node 160 of hidden layer 152 may be selected and may be connected to node 162 of signature network via an edge. The edge may be assigned a weight. As shown in FIG. 1B, the nodes of signature network 156 may process the same inputs as are input to neural network 122, with various nodes of signature network 156 receiving input from their corresponding selected node in neural network 122, as well as input from a prior processing level (if any) in signature network 156, to generate a signature 158. For example, signature 158 shown in FIG. 1C is generated as four bits; however, one skilled in the art of computing will understand that signatures may have any representation (e.g., one thousand bits). Signature 158 is deterministic (i.e., the same input always generates the same output). Thus, each inference of neural network 122 has a unique signature 158.

In some embodiments, the generated unique signature 158 may be input into a linear feedback shift register (LFSR) before the signature is returned to a requester (e.g., in response to a challenge of authenticity). For example, the sequence of a testing image may affect the signature (e.g., video stream images).

In some embodiments, unique signature 158 may be stored in signature log 140, with information identifying the input image and the model of the neural network. For example, such tracking may be advantageously used to determine security breaches. For example, such tracking may be advantageously used to track separate transactions.

In some embodiments, a unique stream or hash may be generated, and stored (e.g., in repository 132) for later use, as an extra level of security.

It may be possible to treat a trained DNN as a piece of software, and deploy software authentication techniques (e.g., generate a checksum, and compare that to yet another generated checksum). However, these this may involve significant computing resources for every verification, and may also be subject to tampering.

Figure 2:
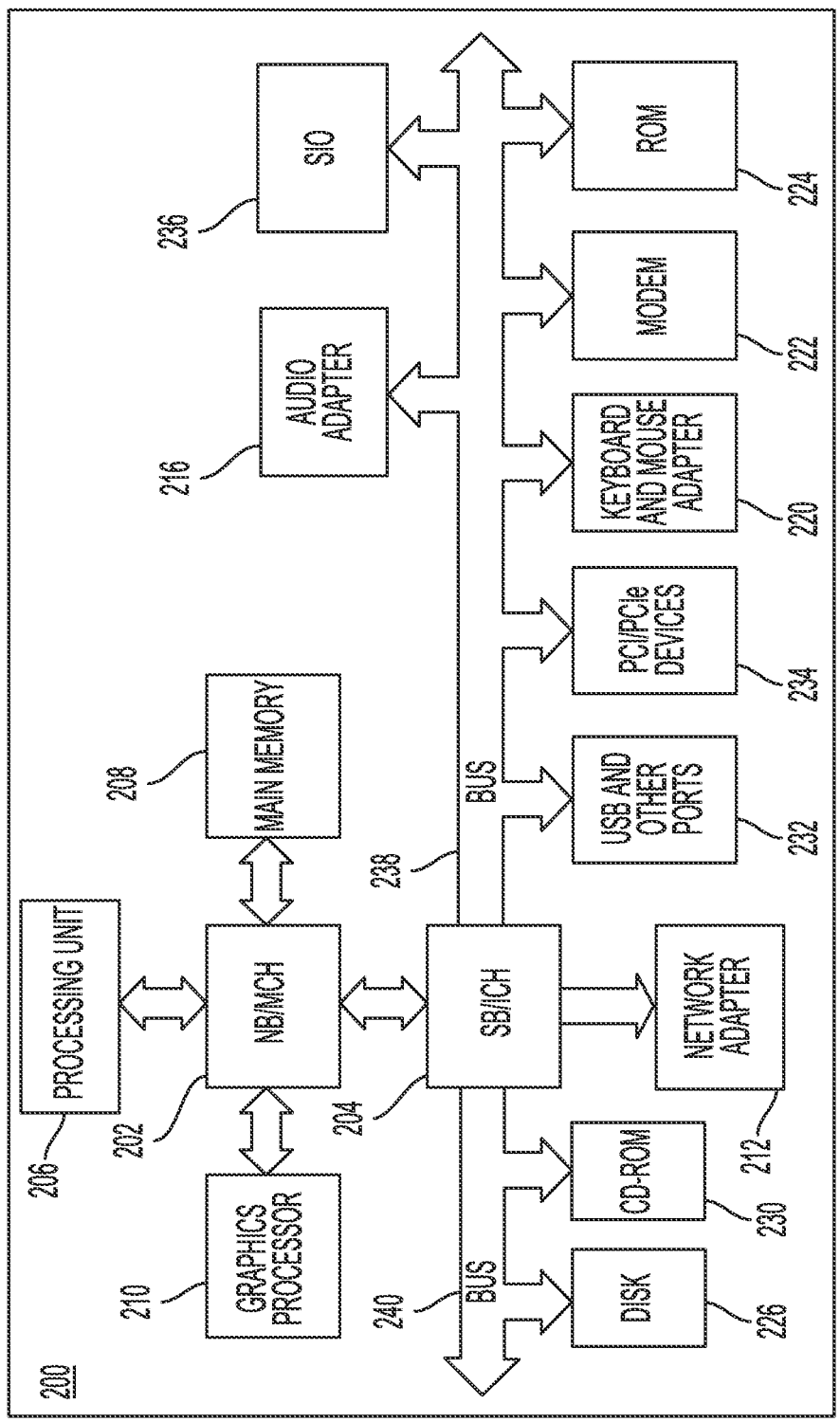
FIG. 2 is a schematic diagram of an embodiment of a hardware system for verifying the authenticity of AI results.

With reference to FIG. 2, this figure depicts a block diagram of a data processing system in which illustrative embodiments may be implemented. Data processing system 200 is an example of a computer, such as servers, or clients, or another type of device in which computer usable program code or instructions implementing the processes may be located for the illustrative embodiments.

Data processing system 200 is also representative of a data processing system or a configuration therein, in which computer usable program code or instructions implementing the processes of the illustrative embodiments may be located. Data processing system 200 is described as a computer only as an example, without being limited thereto. Implementations in the form of other devices may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX®. (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™. (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

Figure 3:
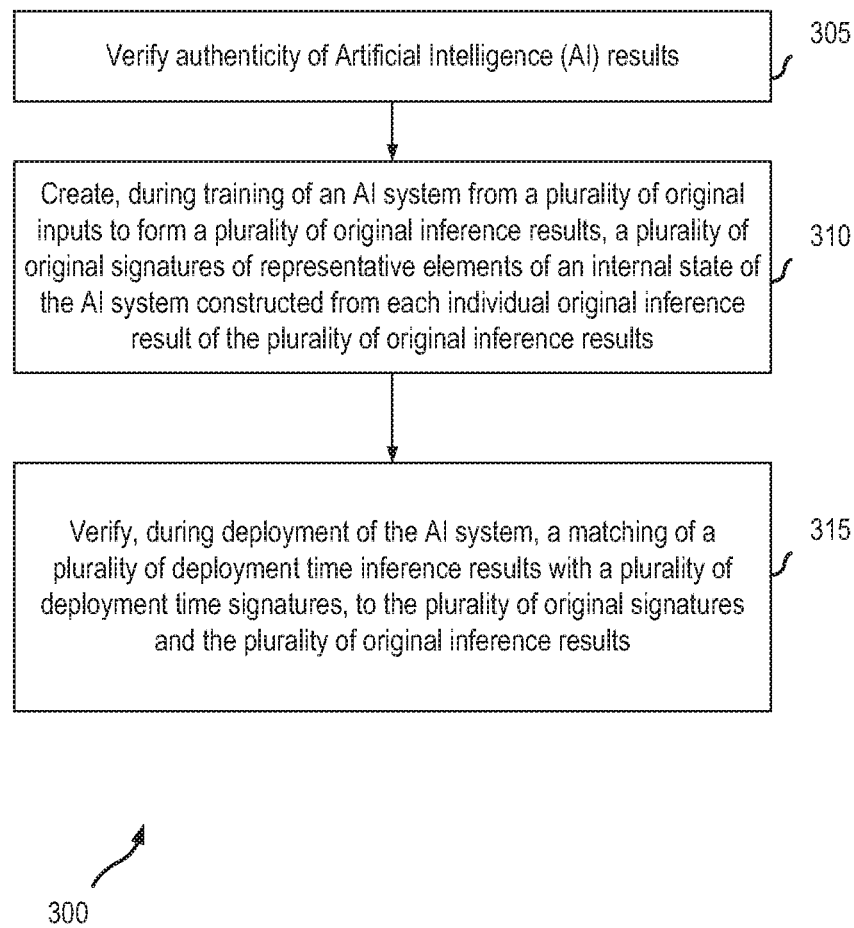
FIG. 3 is a flowchart of an embodiment of verification of the authenticity of AI results.

FIG. 3 is a flowchart 300 of an embodiment of verifying authenticity of Artificial Intelligence (AI) results. As shown in FIG. 3, in step 305, authenticity of AI results may be verified. In step 310, for an AI system, from a plurality of original inputs to form a plurality of original inference results, a plurality of original signatures of representative elements of an internal state of the AI system constructed from each individual original inference result of the plurality of original inference results may be created. For example, a signature network for a DNN may be generated to run in parallel with the DNN to generate unique signatures for each different input. In some implementations, a subset of nodes of the hidden layer of the DNN may be selected at random, and may then be connected to a node of the signature network via a weighted edge. For example, weights may be assigned randomly, to provide improved entropy. Thus, inputs to each selected node in the hidden layer of the DNN may be processed and then output to the corresponding weighted edge to provide input to the corresponding node in the signature network. As shown in FIG. 1C, the signature network 156 may process inputs through multiple layers to generate a unique signature that is deterministic for a particular input and a particular trained model. Thus, if a deployed augmented DNN is the same as the original augmented DNN, then a signature generated as output using the same input, should match the signature by the original augmented DNN.

In step 315, during deployment of the AI system, a matching of a plurality of deployment time inference results with a plurality of deployment time signatures, to the plurality of original signatures and the plurality of original inference results, may be verified. For example, one or more inputs (e.g., input images) may be provided to a deployed system, as input to an augmented trained DNN. The one or more inputs may have already been input to an original version of the augmented trained DNN, to obtain a master signature for comparison. After the one or more inputs have been applied to the deployed system, the resulting output signature from the deployed system may be matched against the master signature. If the matching succeeds, then the deployed system DNN is determined as an authentic version of the DNN, and the system is authenticated.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
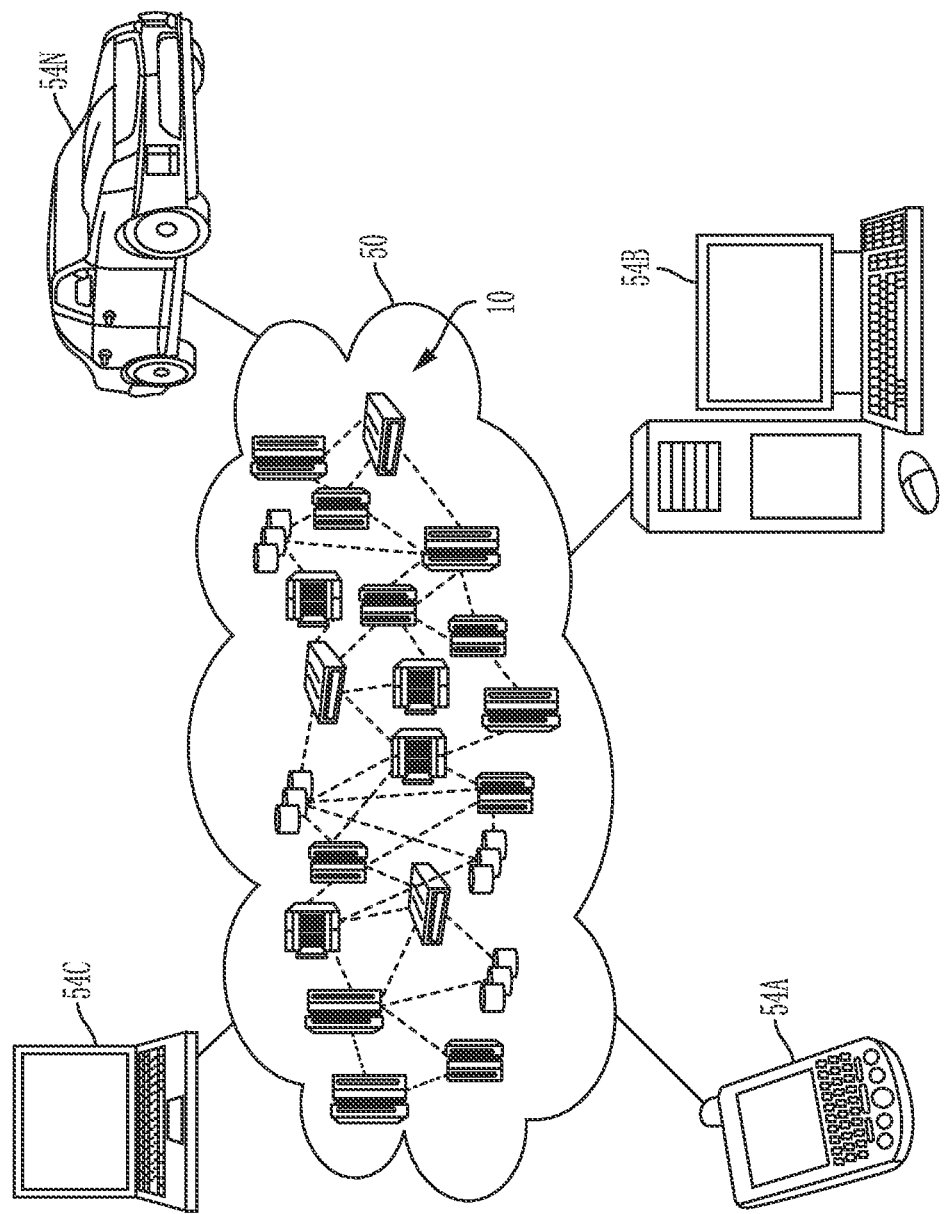
FIG. 4 depicts a cloud computing environment according to an embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
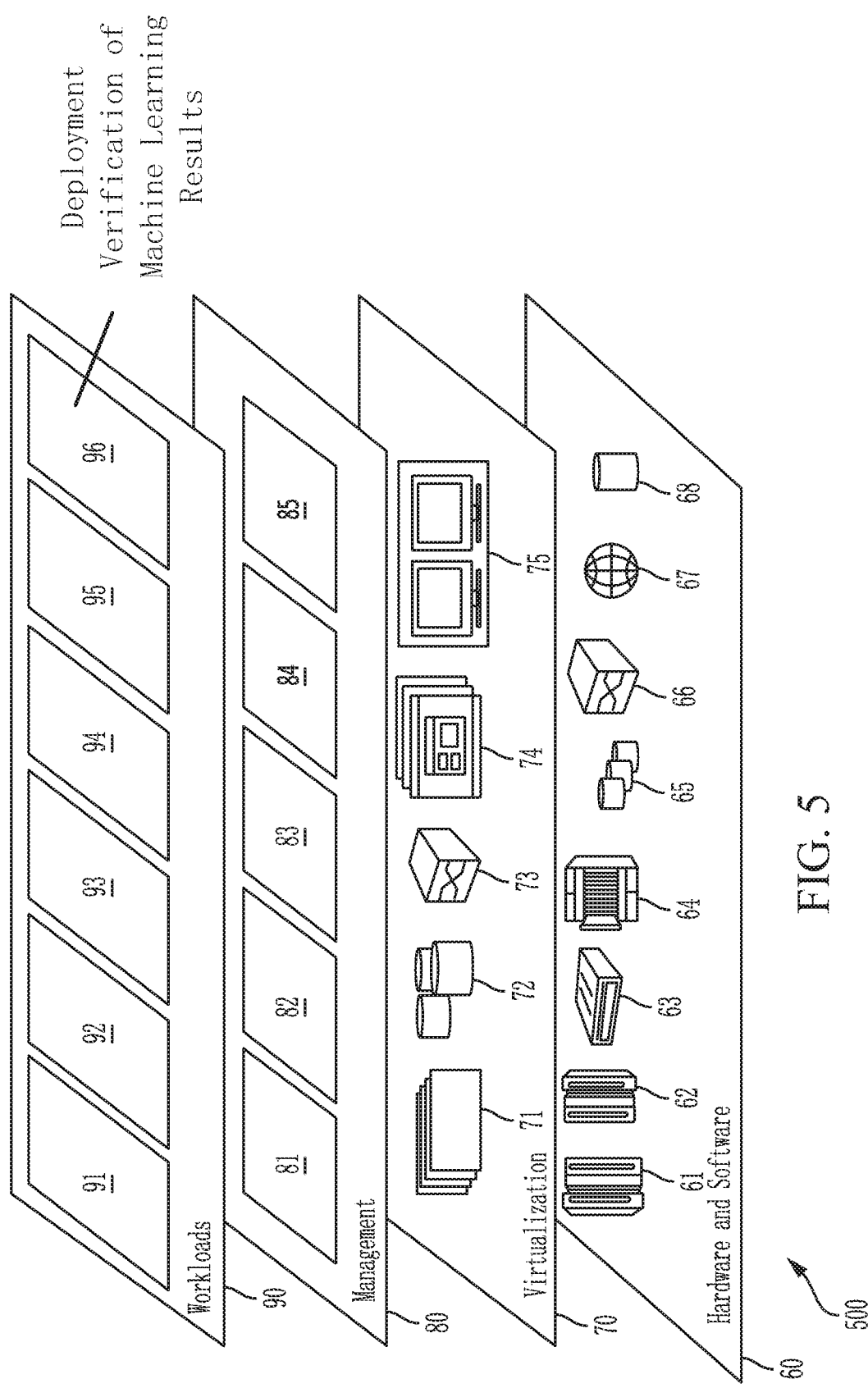
FIG. 5 depicts abstraction model layers according to an embodiment of the present disclosure.

Referring now to FIG. 5, a set of functional abstraction layers 500 provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployment verification of machine learning results 96.

The process software for deployment verification of machine learning results is shared, simultaneously serving multiple customers in a flexible, automated fashion. It is standardized, requiring little customization, and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time, such as minutes, seconds, and hours, on the central processor of the server. Additionally, the accessed server may make requests of other servers that require CPU units. CPU units are an example that represents but one measurement of use. Other measurements of use include, but are not limited to, network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use, such as network bandwidth, memory usage, storage usage, etc., approach a capacity so as to affect performance, additional network bandwidth, memory usage, storage, etc. are added to share the workload.

The measurements of use employed for each service and customer are sent to a collecting server that sums the measurements of use for each customer for each service that was processed anywhere in the network of servers that provide the shared execution of the process software. The summed measurements of use units are periodically multiplied by unit costs, and the resulting total process software application service costs are alternatively sent to the customer and/or indicated on a web site accessed by the customer, who may then remit payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 6:
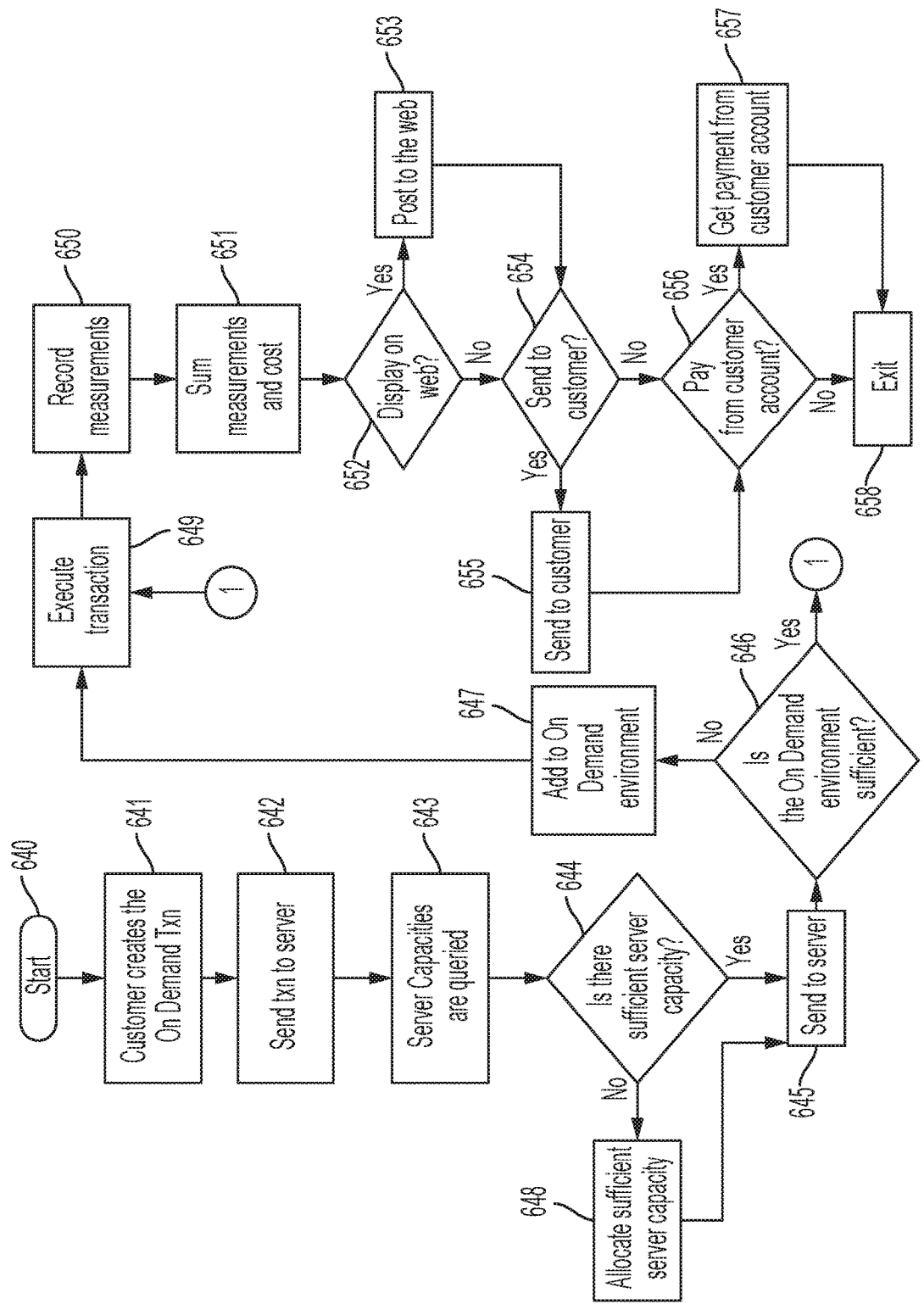
FIG. 6 depicts an on demand service according to an embodiment of the present disclosure.

FIG. 6 depicts an on demand service according to an embodiment. Step 640 begins the On Demand process. A transaction is created that contains the unique customer identification, the requested service type, and any service parameters that further specify the type of service (641). The transaction is then sent to the main server (642). In an On Demand environment, the main server can initially be the only server, and then as capacity is consumed other servers are added to the On Demand environment.

The server central processing unit (CPU) capacities in the On Demand environment are queried (643). The CPU requirement of the transaction is estimated, and then the server's available CPU capacity in the On Demand environment is compared to the transaction CPU requirement to see if there is sufficient CPU available capacity in any server to process the transaction (644). If there is not sufficient server CPU available capacity, then additional server CPU capacity is allocated to process the transaction (648). If there was already sufficient available CPU capacity, then the transaction is sent to a selected server (645).

Before executing the transaction, a check is made of the remaining On Demand environment to determine if the environment has sufficient available capacity for processing the transaction. This environment capacity consists of such things as, but not limited to, network bandwidth, processor memory, storage etc. (646). If there is not sufficient available capacity, then capacity will be added to the On Demand environment (647). Next the required software to process the transaction is accessed, loaded into memory, and then the transaction is executed (649).

The usage measurements are recorded (650). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs, and then recorded as a charge to the requesting customer (651).

If the customer has requested that the On Demand costs be posted to a web site (652), then they are posted thereto (653). If the customer has requested that the On Demand costs be sent via e-mail to a customer address (654), then they are sent (655). If the customer has requested that the On Demand costs be paid directly from a customer account (656), then payment is received directly from the customer account (657). On Demand process proceeds to 658 and exits.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    augmenting a neural network comprising an input layer, hidden layer and an output layer, with a parallel network comprising a plurality of interconnected nodes capable of generating unique signatures that are deterministic, wherein augmenting the neural network with the parallel network comprises:
        randomly selecting a subset of nodes of the hidden layer of the neural network; and
        connecting each selected node from the subset of nodes to a corresponding node of the parallel network via a weighted edge;
    training the neural network augmented with the parallel network by inputting an input into the input layer of the neural network, creating an original signature outputted by the parallel network, constructed from the input into the neural network augmented with the parallel network and an inference outputted from the output layer of the neural network;
    deploying a copy of the neural network augmented with the parallel network;
    inputting into the copy of the neural network augmented with the parallel network, the input used for training the neural network augmented with the parallel network;
    outputting from the copy of the neural network augmented with the parallel network, a signature; and
    verifying output of the copy of the neural network augmented with the parallel network by matching the signature outputted from the copy of the neural network augmented with the parallel network with the original signature, wherein matching signatures authenticate the copy of the neural network.

2. The computer implemented method of claim 1, wherein the neural network utilizes a deep neural network (DNN).

3. The computer implemented method of claim 1, wherein weights assigned to the weighted edge later in time during training of the neural network are lower value weights than weights assigned to weighted edges earlier in time during the training of the neural network.

4. The computer implemented method of claim 1, further comprising:
    inputting the unique signatures outputted by the parallel network into a linear feedback shift register (LFSR) before the unique signatures are returned to a requester in response to a challenge of authenticity of the copy of neural network augmented with the parallel network.

5. The computer implemented method of claim 1, wherein the neural network is configured to process input images.

6. The computer implemented method of claim 1, wherein the neural network is configured to process input speech.

7. The computer implemented method of claim 1, wherein the neural network is configured to process language translations.

8. The computer implemented method of claim 1, wherein the deployed copy of the neural network augmented with the parallel network is supported on an Internet of Things (IoT) environment.

9. The computer implemented method of claim 1, further comprising deploying the copy of the neural network augmented with the parallel network on a cloud environment.

10. A system comprising:
    a device processor; and
    a computer readable storage medium storing instructions that are executable by the device processor to execute a computer-implemented method comprising:
        augmenting a neural network comprising an input layer, hidden layer and an output layer with a parallel network comprising a plurality of interconnected nodes capable of generating unique signatures that are deterministic, wherein augmenting the neural network with the parallel network comprises:
            randomly selecting a subset of nodes of the hidden layer of the neural network; and
            connecting each selected node from the subset of nodes to a corresponding node of the parallel network via a weighted edge;
        training the neural network augmented with the parallel network by inputting an input into the input layer of the neural network, creating an original signature constructed from the input into the neural network augmented with the parallel network and an inference outputted from the output layer of the neural network;
        deploying a copy of the neural network augmented with the parallel network;
        inputting into the copy of the neural network augmented with the parallel network, the input used for training the neural network augmented with the parallel network;
        outputting from the copy of the neural network augmented with the parallel network, a signature; and
        verifying output of the copy of the neural network augmented with the parallel network by matching the signature outputted from the copy of the neural network augmented with the parallel network with the original signature, wherein matching signatures authenticate the copy of the neural network.

11. The system of claim 10, wherein the neural network utilizes a deep neural network (DNN).

12. The system of claim 10, wherein weights assigned to the weighted edge later in time during training of the neural network are lower value weights than weights assigned to weighted edges earlier in time during the training of the neural network.

13. The system of claim 10, wherein the instructions are executable by the device processor to verify authenticity by inputting the unique signatures outputted by the parallel network into a linear feedback shift register (LFSR) before the unique signatures are returned to a requester in response to a challenge of authenticity of the copy of neural network augmented with the parallel network.

14. The system of claim 10, wherein the neural network is configured to process input images.

15. A computer program product comprising a computer readable storage medium storing instructions that are executable by a device processor verifying deployment of a neural network by:
   augmenting the neural network comprising an input layer, hidden layer and an output layer with a parallel network comprising a plurality of interconnected nodes capable of generating unique signatures that are deterministic, wherein augmenting the neural network with the parallel network comprises:
      randomly selecting a subset of nodes of the hidden layer of the neural network; and
      connecting each selected node from the subset of nodes to a corresponding node of the parallel network via a weighted edge;
   training the neural network augmented with the parallel network by inputting an input into the input layer of the neural network, creating an original signature outputted by the parallel network, constructed from the input into the neural network augmented with the parallel network and an inference outputted from the output layer of the neural network;
   deploying a copy of the neural network augmented with the parallel network;
   inputting into the copy of the neural network augmented with the parallel network, the input used for training the neural network augmented with the parallel network;
   outputting from the copy of the neural network augmented with the parallel network, a signature; and
   verifying output of the copy of the neural network augmented with the parallel network by matching the signature outputted from the copy of the neural network augmented with the parallel network with the original signature, wherein matching signatures authenticate the copy of the neural network.

16. The computer program product of claim 15, wherein the neural network utilizes a deep neural network (DNN).

17. The computer program product of claim 15, wherein the instructions are executable by the device processor to verify authenticity by inputting the unique signatures outputted by the parallel network into a linear feedback shift register (LFSR) before the unique signatures are returned to a requester in response to a challenge of authenticity of the copy of neural network augmented with the parallel network.

* * * * *